United States Patent [19]

Poessnecker

[11] Patent Number: 5,561,213

[45] Date of Patent: Oct. 1, 1996

[54] COPOLYETHERESTER HOT-MELT ADHESIVES

[75] Inventor: Gerhard Poessnecker, Trin, Switzerland

[73] Assignee: FMS-Inventa AG, Zurich, Switzerland

[21] Appl. No.: 518,359

[22] Filed: Aug. 23, 1995

[30] Foreign Application Priority Data

Aug. 24, 1994 [DE] Germany ............... 44 30 048.4

[51] Int. Cl.$^6$ ............... C08G 63/183; C08G 63/672; C08G 63/16; C08G 63/00
[52] U.S. Cl. ............... 528/300; 528/301; 528/302; 528/305; 528/308; 528/308.6; 528/308.7
[58] Field of Search ............... 528/300, 301, 528/302, 305, 308, 308.6, 308.7

[56] References Cited

U.S. PATENT DOCUMENTS

| | | | |
|---|---|---|---|
| 4,130,603 | 12/1978 | Tanaka et al. | 528/301 |
| 4,452,853 | 6/1984 | Schade et al. | 528/305 |
| 4,540,749 | 9/1985 | Meyer, Jr. et al. | 528/301 |
| 4,551,521 | 11/1985 | McConnell et al. | 528/308.7 |

FOREIGN PATENT DOCUMENTS

| | | | |
|---|---|---|---|
| 0164910 | 12/1985 | European Pat. Off. . | |
| 0120618 | 10/1986 | European Pat. Off. . | |
| 0204528 | 12/1986 | European Pat. Off. . | |
| 2705270 | 8/1978 | Germany . | |
| 3132059 | 1/1983 | Germany . | |
| 3239413 | 4/1984 | Germany . | |
| 0134114 | 8/1983 | Japan | 528/305 |
| 533165 | 1/1973 | Switzerland . | |

OTHER PUBLICATIONS

Japanese Abstract# J57133217 dated Feb. 3, 1981, "Heat Bonding Co: Fibre . . . Comonomer".
Japanese Abstract# J57095311 dated Jun. 14, 1982, "Copolymerised Polyester Filaments . . . Components".
German Abstract# 159131 dated Dec. 26, 1977, "Polyester Hot Melt Adhesive . . . Heat And Water".

*Primary Examiner*—Peter A. Szekely
*Attorney, Agent, or Firm*—Browdy and Neimark

[57] ABSTRACT

Hot-melt adhesives are based on a random copolyetherester formed from aromatic dicarboxylic acids, terephthalic acid and isophthalic acid wherein the molar proportion of terephthalic acid is at least 55% based on the acid content, with a butanediol content between 20 and 85 mol % and containing at least 10 mol % triethylene glycol; the remainder of the diol content is preferably diethylene glycol. Copolyetheresters of this type are distinguished by excellent adhesion properties, a low melting point, rapid crystallization, and good resistance to laundering and dry cleaning at a minimum viscosity of 80 Pas.

8 Claims, No Drawings

COPOLYETHERESTER HOT-MELT ADHESIVES

FIELD OF INVENTION

The invention is related to copolyetherester hot-melt adhesives, and especially concerns linear, low melting, semi- crystalline copolyetheresters based on the main components terephthalic acid, isophthalic acid, butanediol, triethylene glycol, and optionally diethylene glycol; hot-melt adhesives especially for textiles which use such copolyetheresters; and technical uses of such copolyetherester adhesives.

BACKGROUND

The use of widely varying copolyesters (CoPES) as adhesives has already been described many times in the literature in this field. Among these, it has been proposed to mix the copolyesters with softeners, especially for paste point coating, and indeed the use of softeners in the paste has been considered almost obligatory. Usually aromatic sulfonamide or oligomedc phthalic acid ester is used as the softener, which has the effect of lowering of the melting point and reducing the melting viscosity. Both phenomena lead to a reduction of the response temperature of the hot-melt adhesive, i.e. the glue can be used at lower temperatures.

The use of a softener, however, has a number of disadvantages. First, it increases the cost of the adhesive composition or paste. But a paste with a reduced proportion of softeners is preferable not only for economic reasons, but also for ecological reasons. The poor degradability or partial bactericidal action of sulfonamides in waste water should be mentioned in this connection, as well as the emission of partially volatile substances in the workplace.

It has also been proposed to use low melting point copolyesters. U.S. Pat. No. 4,551,521, for example, describes substances with a melting point between 60° and 130° C. But these compounds involve at least 70.5 mol % adipic acid and 70–99 mol % 1,4-cyclohexanedimethanol. Copolyesters (CoPES) with adipic acid, though, have the disadvantage that, through temperature and/or oxygen reactions, they produce strongly colored decomposition products, the formation of which can be prevented only by adding suitable stabilizers and antioxidants.

Outside the field of copolyester hot-melt adhesives, especially those useful at lower temperatures, a number of copolyetherester compositions have been proposed. Thus, EPA-O 204528 describes an adhesive film of a copolyetherester with at least 85 mol % (TPA), 65–97 mol % butanediol (BDO), and 3–35 mol % of a polyethylene glycol with a molar mass between 106 and 550 g/mol; triethylene glycol (TEDO) falls under this collective description. In these products for film formation, the melting point (determined by means of DSC), must be between 160° and 200° C. Hot-melt adhesives with such high melting points are useless for use in the textile field. Japanese patent disclosures JP 57/133217 and JP 57/095311 both describe the manufacture of fibers based on copolyetherester with up to 20% TEDO along with diol and hexamethylenediol or aliphatic dicarboxylic acids. Swiss patent disclosure CH-A-533 165 likewise concerns copolyesters of aromatic dicarboxylic acids and several glycols; the melting point of the described products is between 160° C. and 220° C., which is too high for use in the textile use region. German patent disclosure DE-A-32 39 413 describes molding compositions based on polybutylene terephthalate with 5–25 mol % of a linear alkanediol with 6–20 C atoms. European patent disclosure EP-A-120 618 describes thermoplastic copolyesters for glue sticks, consisting of 44–53 mol % TPA, 33–48 mol % IPA, and further aliphatic dicarboxylic acids with 4–12 C atoms, which contain at least 90 mol % butanediol as the diol component. Finally, Japanese patent disclosure JP 58/134114 describes copolyesters as hot-melt adhesives that consist exclusively of aromatic diacids (TPA/IPA=40–70/60–30 mol %) and up to 85–98 mol % butanediol, among other glycol components.

None of the aforementioned patent disclosures touch the present invention, which relates in particular to thermoplastic copolyester hot-melt adhesives with low melting points and very high crystallization rates, which can be used as textile hot-melt adhesives at low temperatures of application, and which show excellent resistance to dry cleaning and washing.

SUMMARY OF INVENTION

An object of the present invention is therefore to overcome deficiencies of the prior art, such as those indicated above.

Another object of the invention is to provide low melting, rapidly crystallizing copolyetheresters, which show a sufficient resistance to washing and cleaning procedures, and the adhesive power of which is reduced only a little due to these procedures.

The advantage of a low melting point lies primarily in the possibility of using low application temperatures. This is particularly advantageous in temperature-sensitive materials, such as silk, fur and leather which for this invention are all included in the term "textiles".

The use of a copolyetherester with a high rate of crystallization is important for various reasons. The formation of crystalline regions is a prerequisite for the mechanical strength of a polymer above the glass transition point. Thus the faster the crystalline domains can form, the sooner a load can be put on the glued joint. Furthermore, the surface adhesiveness of a polymer hot-melt adhesive depends directly upon its crystallization. The lower the tendency to crystallize, the longer an intermediate layer, for example, remains sticky. This stickiness leads to difficulties, for example in the rolling up of these layered substances, because individual layers can easily adhere to one another and consequently the whole product becomes unusable. With a rapidly crystallizing polymer, though, this disadvantage is overcome and time consuming tempering procedures are not necessary, which has a positive effect on production speed.

The objects of the present invention are achieved by the low melting, rapidly crystallizing, and flexible copolyetherester hot-melt adhesives of a random copolyester based on terephthalic acid, isophthalic acid, and aliphatic diols, characterized in that the molar proportion of terephthalic acid is at least 55 mol % with reference to the overall acid quantity, the molar proportion of butanediol is less than 85 mol %, and at least 10 mol % triethylene glycol are included, based on the overall diol quantity, wherein optional quantities diethylene glycol and/or 1,5-pentanediol can supplement the diol quantity to make up 100 mol % of diol, and the melting point of the copolyetheresters is between 60° and 130° C. The copolyetheresters, with an acid content of 100% aromatic carboxylic acids, do not suffer from the problems inherent in the prior art, such as those of U.S. Pat. No. 4,551,521, of producing strongly colored decomposition products.

More generally, the objects of the present invention are obtained in hot-melt adhesives of random copolyetheresters with a combination of butanediol (BDO) and triethylene glycol (TEDO) and optionally other aliphatic glycols, preferably diethylene glycol (DEDO), and with terephthalic acid and isophthalic acid as monomers. For textile uses in particular, which involve exposure to detergents and dry cleaning, the viscosity of these adhesives must be over 80 Pas, since as the viscosity drops, the sensitivity to such handling increases.

The particular combination of properties of copolyester hot-melt adhesives, which are the subject of the invention, can be explained through the raw material composition of the compounds. In terephthalic acid/isophthalic acid copolymers, the tendency to crystallization is increased by raising the proportion of terephthalic acid (TPA). Conversely, isophthalic acid (IPA) has a hindering effect on crystallization. At the same time, the melting point increases with the raising of the TPA proportion. This comes to light especially with the copolyesters of both above mentioned aromatic dicarboxylic acids with one diol (e.g. 1,4-butanediol (BDO) or 1,6-hexanediol). Systems of this kind have a relatively flat minimum of the melting point, which occurs with very high proportions of IPA. The melting point curves of these systems rise relatively steeply from a proportion of 50 mol % TPA toward the homopolyester of TPA.

A further object of the invention is to provide a terephthalic acid/isophthalic acid (TPA/IPA) mixture with as high as possible a proportion of TPA, excluding aliphatic dicarboxylic acids, and further including diols, as co-monomers to butanediol, which both (a) clearly lower the melting point and (b) simultaneously promote crystallization.

DETAILED DESCRIPTION OF EMBODIMENTS

In order to guarantee a high crystallization rate, it is advantageous to use a copolyetheresters with a high proportion of TPA. While simultaneously fulfilling the requirement for a low melting point, this also means that the butanediol (BDO) content must be correspondingly low. In other words, the higher the proportion of TPA in the copolyetherester hot-melt adhesive according to the present invention, the lower the proportion of BDO must be. For the hot-melt adhesives according to the invention with a melting point lower than 130° C., this means that the sum of the molar proportions of TPA and BDO, with reference to the overall acid or overall diol quantity of 100 mol % each, may not exceed a value of 140 mol %.

Unexpectedly, the use of triethylene glycol has a lasting positive influence on the properties of the copolymer with the above required attribute profile. Copolyetherester with a constant proportion of TPA to IPA and a constant BDO content show a lower melting point when TEDO is used instead of DEDO as the remaining diol component. Moreover, the use of TEDO also accelerates crystallization.

If DEDO and TEDO are used as a remainder diol mixture, the melting point can likewise exceed a flat minimum, which is on the TEDO side, depending on the DEDO:TEDO ratio. In these series, the crystallization rate increases with an increasing TEDO content. Due to the additional melting point decrease, mixtures of DEDO and TEDO also constitute an alternative attainment of the objects of the invention and can be used in a copolyetherester recipe aside from TPA/IPA/BDO.

For the aforementioned reasons, however, a proportion of at least 10 mol % TEDO (based on the diol content) is advantageous. It simultaneously effects an advantageous increase in the adhesive power as shown below in Examples H and X3 (see Table 1). These considerations also apply whenever the DEDO is replaced with the isosteric 1,5-pentanediol.

As the proportion of triethylene glycol increases, the product gains increasing flexibility. In the synthesis of copolyesters, if a few mol % of higher molecular oligomers of ethylene glycol, such as tetraethylene glycol, pentaethylene glycol, etc., are added to the starting batch, at the expense of the proportion of triethylene glycol, then also products of greater flexibility are obtained. There are no negative effects on adhesion. However; the melting-point-lowering effect disappears as the length of the ethylene glycol oligomers increases, given a constant weight proportion in the polymer.

The mentioned high profile of requirements only can be met by the copolyetherester of the present invention. In the comparative example X2/table 1, the hexandiol based copolyester certainly shows a low melting point and a high rate of crystallization, but this type of copolyester has both very low adhesive strength and low resistance to laundering and dry cleaning.

For the present copolyetherester hot-melt adhesives, the molar proportion of terephthalic acid is at least 55 mol % with respect to the overall acid quantity, the molar proportion of butanediol based on the overall diol content is less than 85 mol %, the molar proportion of triethylene glycol is at least 10 mol %, and optionally supplemented with up to 100 mol % of diol content with diethylene glycol and/or 1,5-pentanediol of which diethylene glycol is preferred.

In preferred embodiments, the combination consists essentially of at least 65 mol % terephthalic acid (based on the acid content) at a butanediol proportion between 20 and 60 mol % (based on the diol content); the remaining diol proportion consists of diethylene glycol, and/or 1,5-pentanediol as well as the important triethylene glycol (TEDO), and the proportion of the first two diols to TEDO is no greater than 3:1, preferably 1:1–0:1.

The melting point of the copolyetherester hot-melt adhesives according to the invention is between 60° and 130° C., preferably between 80° and 110° C., and their melting viscosity, measured according to ISO/DIN 1133, is not less than 80 Pas.

The advantages of this invention depend on the special effect of the triethylene glycol, which is believed to have never before been recognized in the art. Surprisingly with the claimed selected rate of TEDO such combinations of the favored low melting temperatures and extremely high crystallisation rates can be obtained.

The copolyetherester hot-melt adhesives according to the invention are used for the manufacture of powdered hot-melt adhesives with varying fractions in powder point, paste point, and scatter coating. The copolyetherester hot-melt adhesives according to the invention are particularly preferred for use because of their low activation temperature in the paste point process, where they are applied as pastes with reduced softener quantities.

Processing into powdered products can be carded out by known processes, such as the cold milling process.

In the following non-limiting examples, the copolyetheresters according to the invention are compared with other products.

The DSC measurements were carded out with a type 1090 B apparatus made by DuPont. The melting point is indicated as the maximum peak melting point; the specimens were heated at the rate of 20 K/min. The melt viscosities were tested by the flowing out process at 160° C. according to DIN/ISO 1133.

Coating and Adhesion Parameters

To test the adhesion strength on textiles, powders with a particle size of 80–200 mm were coated on a conventional interlining by means of a powder point coating apparatus with a 17-mesh gravure roller. The coating weight was adopted to 17±5 g/m² and then the samples were pressed at various temperatures and a pressing power of 0.4 bar with a conventional top fabric.

To measure the adhesion strength on textiles, glued strips of textile 5 cm wide were secured in a traction machine. The test parameters were constant in all measurements:

Test rate: 100 mm/min
Specimen width: 50 mm
Test distance: 80 mm
Prestress force: 0N
Test temperature: 25° C.

Table 1 indicates the adhesion strength for the copolyetheresters A–H with varying composition, adhered together at glue line temperature 100° C. and 120° C. respectively.

X1, X2, X3 are comparative products.

The following abbreviations signify the assigned meanings:
HD 1,6-hexanediol
TPA terephthalic acid
IPA isophthalic acid
BDO butanediol
DEDO diethylene glycol
TEDO triethylene glycol
OA original adhesion
DW adhesion after laundering (40° C.)
DC adhesion after dry cleaning The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A hot-melt adhesive of a random copolyetherester based on terephthalic acid, isophthalic acid, and aliphatic diols, wherein the molar proportion of terephthalic acid is at least 55 mol % based on the overall acid quantity, the diol content comprises less than 85 mol % of butanediol, at least 10 mol % triethylene glycol and optionally an additional glycol selected from the group consisting of diethylene glycol, 1,5-pentanediol and mixture thereof to make up 100 mol % of the diol quantity, the sum of the proportions of terephthalic acid and butanediol is maximally 140 mol % and the melting point of the copolyetherester is between 60° and 130° C.

2. The copolyetherester hot-melt adhesive according to claim 1, having a composition of at least 65 mol % of said terephthalic acid based on the acid content, a butanediol proportion between 20 and 60 mol % based on the diol content, wherein the remainder diol proportion comprises said triethylene glycol and said additional glycol, the proportion of said triethylene glycol to said additional glycol being between 1:3 and 1:0.

3. The copolyetherester hot-melt adhesive according to claim 2, having a melting point between 80° and 110° C.

TABLE 1

| | Adhesion Strength of the Individual Copolyetheresters and Copolyesters: | | | | | | | | | | | | |
|---|---|---|---|---|---|---|---|---|---|---|---|---|---|
| | Composition in mol % | | | | | | | | 100° C. | glue line temperature | 120° C. | | |
| Test | TPA | IPA | BDO | DEDO | TEDO | HD | M.P.*) [°C.] | Visc. [Pas] | OA | DW [N/5 cm] | DC | OA | DW [N/5 cm] | DC |
| A | 70 | 30 | 70 | — | 30 | | 123 | 100 | 7.5 | 6.7 | 4.8 | 11.7 | 9.8 | 7.7 |
| B | 70 | 30 | 70 | 15 | 15 | | 116 | 190 | 7.0 | 5.8 | 3.0 | 10.5 | 8.5 | 4.5 |
| C | 75 | 25 | 65 | — | 35 | | 110 | 250 | 7.7 | 5.0 | 2.7 | 11.0 | 9.0 | 4.0 |
| D | 55 | 45 | 85 | — | 15 | | 101 | 183 | 5.0 | 2.8 | 1.3 | 7.9 | 4.8 | 2.0 |
| E | 65 | 35 | 70 | — | 30 | | 104 | 304 | 8.0 | 5.5 | 1.8 | 12.0 | 7.0 | 4.3 |
| F | 100 | — | 40 | — | 60 | | 110 | 370 | 7.5 | 6.3 | 4.4 | 12.3 | 8.5 | 5.6 |
| G | 90 | 10 | 40 | 30 | 30 | | 103 | 370 | | | | 13.1 | 9.6 | 10.2 |
| H | 80 | 20 | 50 | 25 | 25 | | 104 | 500 | | | | 12.1 | 7.7 | 9.4 |
| X1 | 45 | 55 | 100 | | | | 115 | 700 | 8.0 | 1.8 | X | 10 | 6 | |
| X2 | 80 | 20 | 30 | — | — | 70 | 104 | 250 | 2.5 | X | X | 3 | 2 | 1.5 |
| X3 | 80 | 20 | 50 | 50 | — | | 113 | 200 | 2.7 | 2.4 | 1.8 | 7.3 | 4.6 | 2.3 |

X = delaminating occurred,
*)m.p. = melting point

As pointed out above, while comparative example X2 has both a low melting point and a high rate of crystallization, it is unsatisfactory because of its poor adhesive strength and low resistance to laundering and dry cleaning. Comparing examples H and X3 shows the importance of the TEDO.

4. The copolyetherester hot-melt adhesive according to claim 3, having a melting viscosity, measured according to ISO/DIN 1133 at 160° C., of not less than 80 Pas.

5. The copolyetherester hot-melt adhesive according to claim 1, having a melting point between 80° and 110° C.

6. The copolyetherester hot-melt adhesive according to claim 1, having a melting viscosity, measured according to ISO/DIN 1133 at 160° C., of not less than 80 Pas.

7. The copolyetherester hot-melt adhesive according to claim 2, having a melting viscosity, measured according to ISO/DIN 1133 at 160° C., of not less than 80 Pas.

8. A hot-melt adhesive of a random copolyetherester based on terephthalic acid, isophthalic acid, and aliphatic diols, wherein the molar proportion of terephthalic acid is at least 55 mol % based on the overall acid quantity, the diol content comprises less than 85 mol % of butanediol, at least 10 mol % triethylene glycol and optionally an additional glycol selected from the group consisting of diethylene glycol, 1,5-pentanediol and mixtures thereof to make up 100 mol % of the diol quantity, the sum of the proportions of terephthalic acid and butanediol is maximally 140 mol % and the melting point of the copolyetherester is between 60° and 130° C., and the hot-melt adhesive is in powder or paste form.

* * * * *